United States Patent [19]

Park

[11] Patent Number: 5,386,407
[45] Date of Patent: Jan. 31, 1995

[54] APPARATUS FOR EJECTING A CADDY FROM A DISK PLAYER

[75] Inventor: Jeong-se Park, Suwon, Rep. of Korea

[73] Assignee: SamSung Electronics Co., Ltd., Suwon, Rep. of Korea

[21] Appl. No.: 867,448

[22] Filed: Apr. 13, 1992

[30] Foreign Application Priority Data

May 14, 1991 [KR] Rep. of Korea ............... 91-7754

[51] Int. Cl.⁶ ................ G11B 17/04; G11B 17/035
[52] U.S. Cl. ................... 369/77.2; 360/99.06
[58] Field of Search ........... 360/99.02, 99.03, 99.06, 360/99.07; 369/77.1, 77.2

[56] References Cited

U.S. PATENT DOCUMENTS

| | | | |
|---|---|---|---|
| 4,415,940 | 11/1983 | Becker | 360/99.02 |
| 4,586,097 | 4/1986 | Koike et al. | 360/99.02 |
| 4,635,149 | 1/1987 | Okita et al. | 360/197 |
| 4,679,106 | 7/1987 | Okita et al. | 360/99 |
| 4,685,010 | 8/1987 | Tronzano | 360/99.06 |
| 4,772,973 | 9/1988 | Ohkita et al. | 360/99.02 |
| 4,835,638 | 5/1989 | Takeda | 360/99.02 |
| 4,864,440 | 9/1989 | Satoh et al. | 360/99.06 |
| 5,060,096 | 10/1991 | Hirose et al. | 360/99.06 |
| 5,126,899 | 6/1992 | Kanazawa | 360/99.07 |

FOREIGN PATENT DOCUMENTS

| | | |
|---|---|---|
| 3017970A1 | 11/1981 | Germany. |
| 60-115059 | 6/1985 | Japan ............... 360/99.06 |
| 61-248260 | 11/1986 | Japan ............... 360/99.06 |

OTHER PUBLICATIONS

IBM Technical Bulletin, vol. 29, No. 2, Jul. 1986, pp. 666 and 667.

Primary Examiner—Stuart S. Levy
Assistant Examiner—Paul K. Ditmyer
Attorney, Agent, or Firm—Robert E. Bushnell

[57] ABSTRACT

Disclosed is an apparatus for ejecting a caddy from a disk player, the apparatus comprising a slider installed on the bottom of a lower case of the disk player capable of linear movement and elastically biased by a spring towards a caddy inlet, an eject pin installed on a loader, and an ejector rotatably installed on the lower case in such a manner that one end thereof is connected to be linked with the slider and a linking unit and the other side has a hooking plate contacting the eject pin of the loader to move the eject pin, an external force acts on the slider which in turn rotates the ejector, thereby ejecting the caddy. Therefore, the caddy can be easily ejected when electricity has failed or the disk player is malfunctioning.

18 Claims, 5 Drawing Sheets

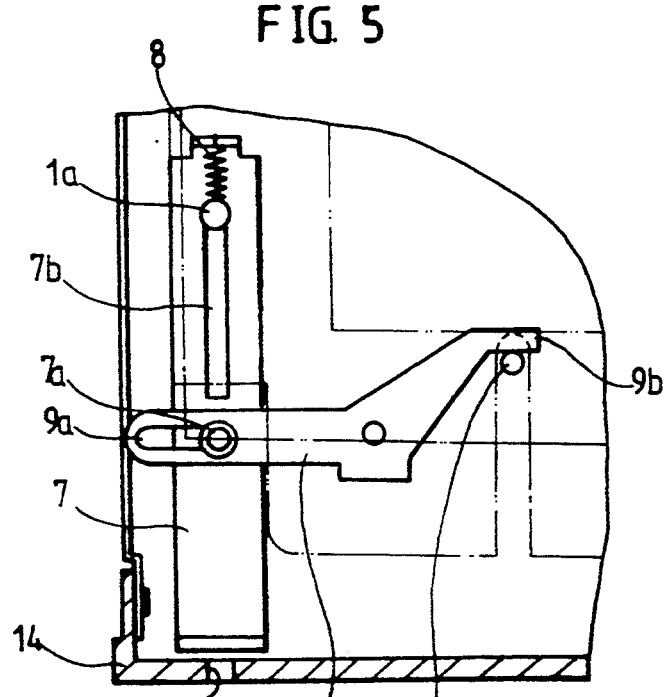
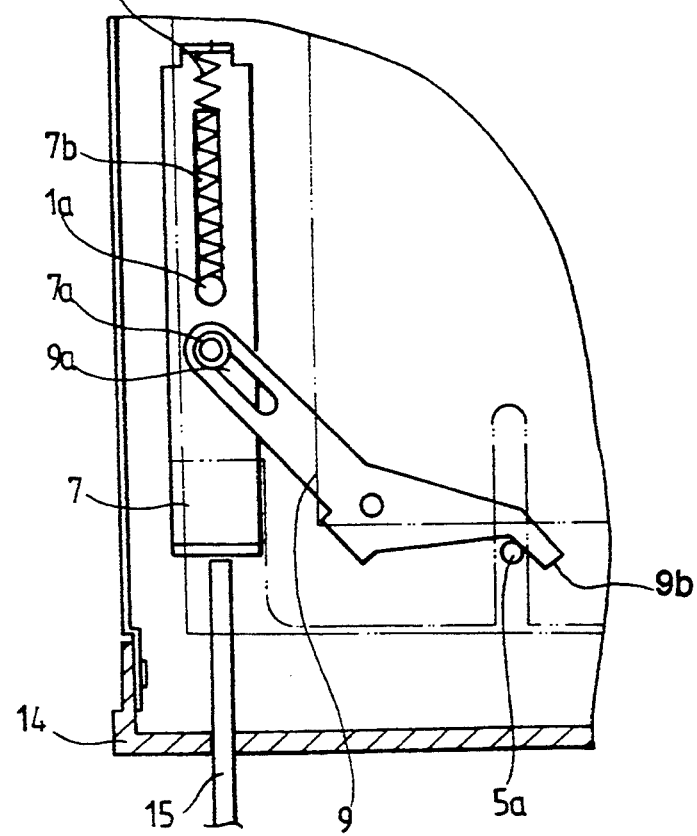

APPARATUS FOR EJECTING A CADDY FROM A DISK PLAYER

BACKGROUND OF THE INVENTION

The present invention relates to an apparatus for ejecting a caddy from a disk player, and more particularly to an apparatus for ejecting a caddy from a disk player when electricity has failed or the disk player is malfunctioning in order to easily remove the caddy.

In an optical disk player such as a Magneto optical disk player or a CD-ROM, or any disk player using a 3.5-inch magnetic diskette, when a disk caddy or cartridge is put into the player's front inlet, the caddy is automatically moved toward a turntable in the player, and then is taken out by pushing an eject button. A conventional mechanism for inserting and withdrawing such a caddy is shown in FIGS. 1 and 2.

According to FIG. 1, a holder 6 receives a caddy 12 which is placed onto a supporting plate 2, while a loader 5 is mounted between the supporting plate 2 and the holder 6. Loader 5 has a rack gear portion 5b and is connected to a motor 10 via a variable speed gear group 11. Motor 10 is driven in the forward or reverse direction in response to a sensor 13 mounted on one side of the rear of holder 6 and an eject button switch (not shown).

Also, referring to FIG. 2, L-shaped openings 2b are formed in a side wall 2a of supporting plate 2, and dog-legged slots 5d are formed in a side wall 5a of loader 5. Guide pins 6b placed on a side wall 6a of holder 6 are inserted into slots 5d and through openings 2b. Therefore, according to the movement of motor 10, holder 6 moves horizontally or vertically, while loader 5 moves horizontally, so that the caddy 12 inserted into holder 6 is mounted onto or separated from turntable 16. Here, reference numeral 4 designates a pickup unit.

In this structure, since motor 10 is driven to move loader 5, and loader 5 is moved in order to move holder 6, if power fails or the motor driving circuit is inoperative for some reason, neither loader 5 nor holder 6 can be moved. Therefore, to remove caddy 12 inserted in holder 6 during such a circuit failure, the apparatus must be disassembled and reassembled.

SUMMARY OF THE INVENTION

The object of the present invention is to provide an apparatus for ejecting a caddy from a disk player, so that a user can easily remove a caddy without disassembling the disk player when the caddy cannot be taken out automatically due to sudden power failure or for other reasons.

To achieve the object of the present invention, an apparatus for ejecting a caddy from a disk player comprising a loader installed on a side wall of a supporting plate which is installed on a lower case, the loader being capable of moving a predetermined distance and loading or unloading the caddy inserted on a caddy holder by moving the caddy holder forward and rearward as well as upward and downward while being moved forward and rearward by a motor and a variable speed gear group, comprises:

a slider installed on the bottom of the lower case and capable of linear movement, and elastically biased towards an inserted position of the caddy by a spring;

an eject pin installed on the loader; and an ejector placed on the lower case and capable of rotating, and connected in such a manner that one end of the ejector is linked with the slider and a linking unit and the other end has a hooking plate contacting the eject pin of the loader, wherein the slider is advanced by an external force so that the ejector is rotated to eject the caddy.

BRIEF DESCRIPTION OF THE DRAWINGS

The above object and other advantages of the present invention will become more apparent by describing the preferred embodiment of the present invention with reference to the attached drawings, in which;

FIG. 5 is a partially cut-away plane view illustrating an apparatus for ejecting a caddy of a disk player according to the present invention before the caddy is ejected; and FIG. 6 is a partially cut-away plane view illustrating an apparatus for ejecting a caddy of a disk player according to the present invention after the caddy is ejected.

DETAILED DESCRIPTION OF THE INVENTION

Figure 1:
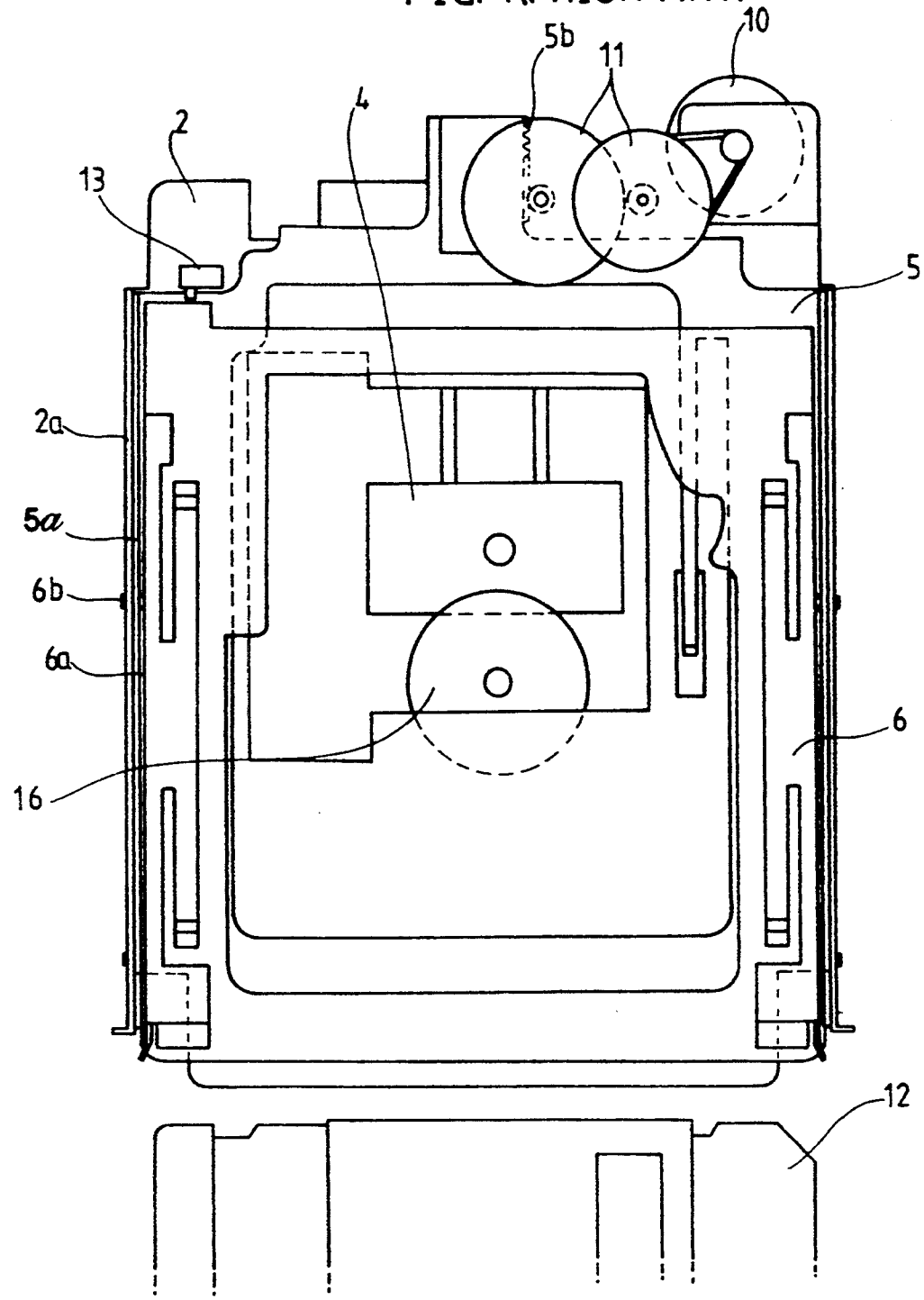
FIG. 1 is a plane view illustrating a conventional apparatus for ejecting a caddy from an optical disk player.
Figure 2:
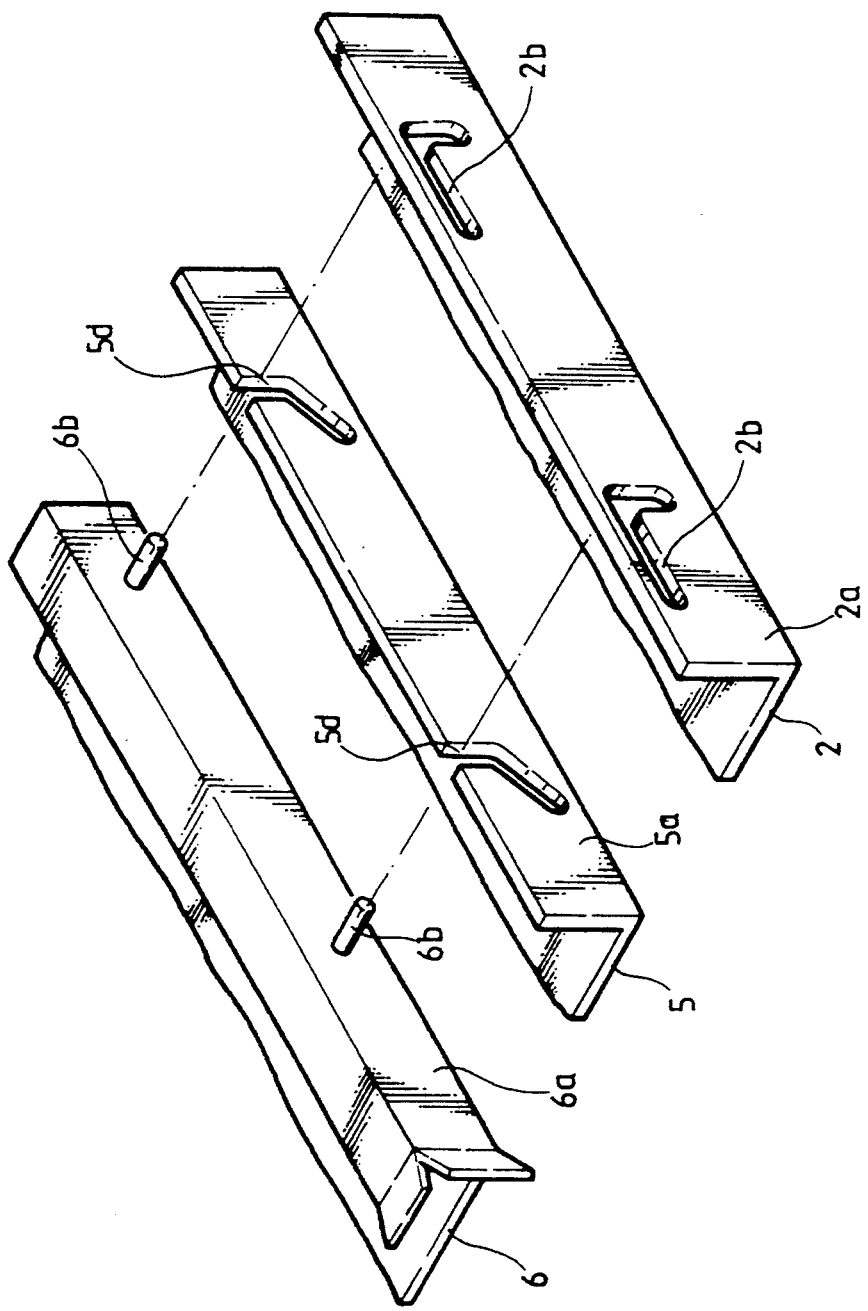
FIG. 2 is a perspective view showing a separated and extracted part of FIG. 1.
Figure 3:
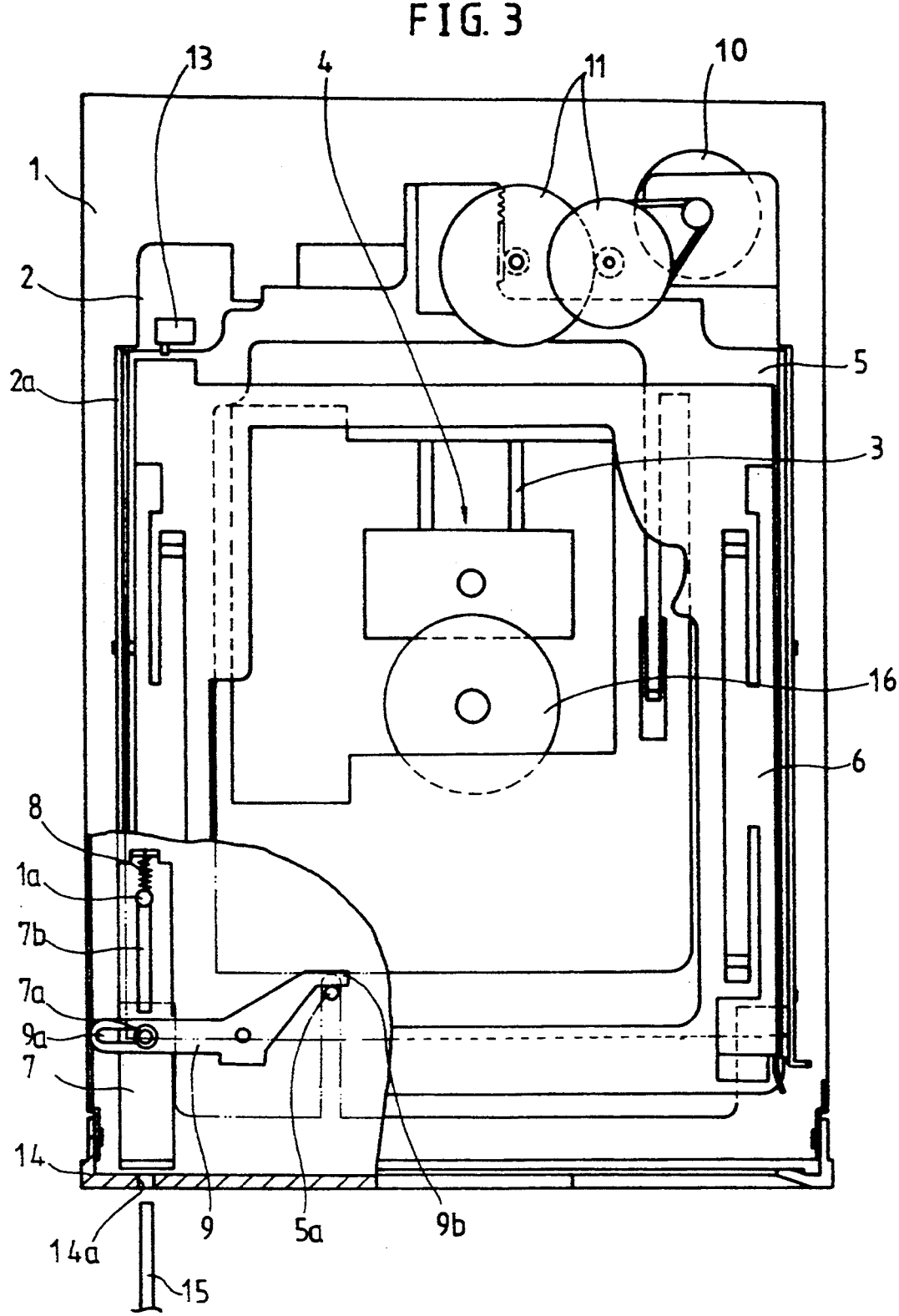
FIG. 3 is a partially cut-away plane view illustrating an apparatus for ejecting a caddy from a disk player according to the present invention.
Figure 4:
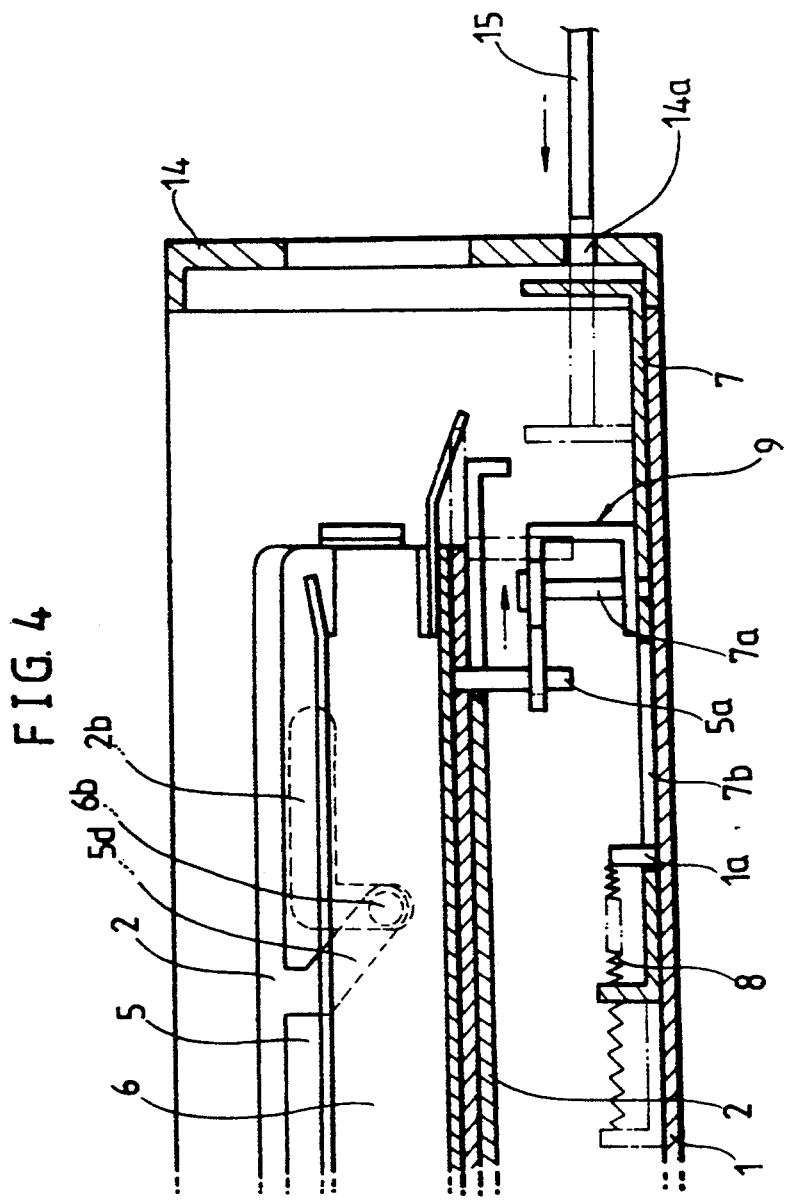
FIG. 4 is a side sectional view of the functional portions of the apparatus shown in FIG. 3.

In an apparatus for ejecting a caddy from a disk player according to the present invention as illustrated in FIGS. 3 and 4, a supporting plate 2 is mounted on the bottom of the inner side of a lower case 1, and a pair of guide rods 3 is mounted on the lower face of supporting plate 2, wherein a pickup unit 4 is connected to the pair of guide rods 3 to be linearly guided. A side wall 2a is formed on each side of supporting plate 2 in such a manner that the wall is extended upwards of supporting plate 2 by a predetermined length. Loader 5 is mounted on side wall 2a and connected to a motor 10 via a variable speed gear group 11, the loader 5 being capable of moving forward and rearward. A caddy holder 6 where a caddy 12 is inserted, is installed on side wall 2a of supporting plate 2 by the forward and rearward movement of loader 5, the caddy holder 6 being capable of moving in the forward, rearward, up and down directions. A sensor 13 which detects the insertion of caddy 12 into caddy holder 6 to operate motor 10, is installed on one side of supporting plate 2. A slider 7 having an elongated guide hole 7b is installed on the bottom of lower case 1 in such a manner that the slider 7 can move linearly according to a guide pin 1a which is connected to the elongated guide hole 7b, the slider 7 being capable of moving and is elastically biased by a spring 8 toward a front panel 14 of the lower case 1 where the caddy inlet is formed. An eject pin 5a is installed on the lower face of loader 5, and an ejector 9 is rotatably installed on the bottom of lower case 1 in such a manner that one side is connected to be linked to slider 7 and the linking unit (described later), and the other side is in contact with eject pin 5a of loader 5. A passing hole 14a, for receiving an operating rod 15 to push slider 7 to move, is formed on front panel 14.

The linking unit comprises connecting pin 7a installed on slider 7 and a slotted hole 9a formed on ejector 9 to receive connecting pin 7a, the connecting pin 7a capable of moving within slotted hole 7c.

The apparatus for ejecting a caddy of a disk player according to the present invention, constructed as above, is used when electricity has failed or when the disk player is malfunctioning while a user loads a caddy into the disk player. Firstly, under the state illustrated in FIG. 5, when operating rod 15 is inserted in passing hole 14a formed on front panel 14 of the lower case 1 and pushed, slider 7 overcomes the elastic force of spring 8 to linearly move in a direction opposite of front panel 14 where the inserting hole of the caddy is formed, according to guide pin 1a formed on lower case 1 and elongated guide hole 7b formed on slider 7. Then, if slider 7 moves, one end of ejector 9 is rotated towards the direction to which slider 7 moves according to a linking unit comprising connecting pin 7a installed thereon and slotted hole 9a formed on the one end of ejector 9, where connecting pin 7a is capable of moving within slotted hole 9a. At this time, hooking plate 9b, formed on the other end of ejector 9, moves eject pin 5a in the direction opposite to which slider 7 moves, as shown in FIG. 6. Therefore, while loader 5 is moving, caddy holder 6 where caddy 12 is inserted, is raised and moved in the same direction as loader 5, so that caddy 12 is ejected from caddy holder 6. Here, when operational rod 15 is removed after caddy 12 has been ejected from caddy holder 6, slider 7 is restored to its original position by the elastically stored force of spring 8, so that ejector 9 mounted to be linked with slider 7 and the linking unit, is restored to its original position.

As described above, an apparatus for ejecting a caddy from a disk player according to the present invention can easily eject a caddy from a player by the manual operation of exerting an external force to a slider when the electricity has failed or when the player is malfunctioning. Thus, disassembly the upper case in order to eject a caddy from the disk player in the above situation, is unnecessary.

What is claimed is:

1. An apparatus for ejecting a caddy inserted on a caddy holder from a disk player, comprising:
    a lower case;
    a supporting plate having a side wall, said supporting plate installed on said lower case;
    a loader installed on said side wall of said supporting plate, for loading and unloading the caddy inserted on the caddy holder by moving the caddy holder in a forward, a rearward, an up and a down direction while said loader is being moved forward and rearward by a motor and a variable speed gear group;
    a slider installed on a bottom of said lower case disposed to move linearly, said slider being elastically biased towards a caddy inlet by a spring;
    an eject pin installed on said loader; and
    an ejector rotatably installed on said lower case in such a manner that a first end of said ejector is linked with said slider by a linking means and a second end of said ejector has a hooking plate contacting and moving said eject pin of said loader;
    whereby said slider is operated by an external force, such that said ejector is rotated to eject the caddy.

2. An apparatus for ejecting a caddy from a disk player as claimed in claim 1, wherein said linking means comprises:
    a connecting pin installed on said slider; and
    a slotted hole formed on said first end of said ejector, for receiving said connecting pin and for allowing said connecting pin to move within said slotted hole.

3. An apparatus for ejecting a caddy inserted onto a caddy holder from a disk player having a turntable, said apparatus comprising:
    a lower case having a bottom and a front panel containing a receiving hole;
    a support plate fixed to said lower case, said support plate having a side wall perpendicular to said bottom of said lower case;
    loading means attached to said side wall, disposed to move in a first direction of insertion of the caddy into the disk player and a second direction opposite to said first direction, for moving the caddy holder in said first and second directions and along a path of travel parallel to an axis of rotation of said turntable:
    slide means disposed to move in said first and second directions, for receiving an external fierce applied through said receiving hole;
    lever means rotatably installed onto said lower case, having a first end slideably attached to said slide means and a second end connected to said loading means, for moving said loading means in said second direction in response to movement by said slide means in said first direction;
    a connecting pin slideably attaching said slide means to said first end of said lever means and disposed in a direction parallel to said axis of rotation of said turntable; and
    a slotted hole having an inner width greater than a diameter of said connecting pin, said slotted hole positioned in said first end of said lever means for receiving said connecting pin;
    said connecting pin being movable in said first direction in response to movement by said slide means in said first direction, simultaneously traversing said inner width of said slotted hole and causing rotation of said lever means.

4. The apparatus as claimed in claim 3, further comprising:
    an eject pin attached to said loading means, for contacting said second end of said lever means, and for moving said loading means in said second direction in response to said rotation of said lever means.

5. The apparatus as claimed in claim 4, further comprising:
    a guide pin formed on said lower case; and
    a guide hole having an inner width in said first and second directions greater than a diameter of said guide pin, said guide hole located in said slide means, for receiving said guide pin to ensure movement of said slide means in only said first and second directions.

6. The apparatus as claimed in claim 5, further comprising:
    means for biasing said slide means in said second direction.

7. The apparatus as claimed in claim 3, further comprising:
    guide pin formed on said lower case; and
    guide hole having an inner width in said first anti second directions greater than a diameter of said guide pin, said guide hole located in said slide means, for receiving said guide pin to ensure movement of said slide means in only said first and second directions.

8. The apparatus as claimed in claim 3, further comprising:
means for biasing said slide means in said second direction.

9. An apparatus for ejecting a caddy inserted onto a caddy holder from a disk player comprising a base and a turntable, said apparatus comprising:
loading means disposed to move in a first direction of insertion of the caddy into the disk player and a second direction opposite said first direction, for moving the caddy holder in said first and second directions and along a path of travel parallel to an axis of rotation of said turntable;
support means affixed to said base and having a side wall perpendicular to said base, wherein said side wall engages said loading means, for enabling said loading means to move in said first and second directions:
slide means disposed to move in said first and second directions and resiliently biased in said second direction, for moving in said first direction in response to an external force at a first end of said slide means in said first direction;
lever means rotatably installed onto said lower base, having a first end slideably attached to said slide means and a second end connected to said loading means, for linearly moving said loading means in said second direction in response to said movement of said slide means in said first direction;
a connecting pin slideably attaching said slide means to said first end of said lever means and disposed in a direction parallel to said axis of rotation of said turntable; and
a slotted hole having an inner width greater than a diameter of said connecting pin, said slotted hole positioned in said first end of said lever means for receiving said connecting pin;
said connecting pin being movable in said first direction in response to movement by said slide means in said first direction, simultaneously traversing said inner width of said slotted hole and causing rotation of said lever means; and
resilient means for biasing said slide means in said second direction.

10. The apparatus of claim 9, further comprised of said lever means pulling said loading means in said second direction in response to said movement of said slide means in said first direction.

11. The apparatus as claimed in claim 9, further comprising:
an eject pin attached to said support means, for engaging said second end of said lever means during said rotation of said lever means in order to linearly move said loading means in said second direction;
a guide pin formed on said base; and
an elongated guide hole formed in said slide means for receiving said guide pin, and for allowing said movement of said slide means only in said first and second directions.

12. The apparatus as claimed in claim 11, wherein a first end of said resilient means is attached to said guide pin and a second end of said resilient means is attached to a second end of said slide means opposite said first end of said slide means.

13. The apparatus of claim 11, further comprised of said connecting pin being attached to said slide means at a side of said slide means proximal to a hole for receiving said external force.

14. The apparatus of claim 13, further comprised of said eject pin engaging said second end of said lever means during rotation of said lever means in order to pull said loading means in said second direction.

15. The apparatus of claim 11, further comprised of said eject pin engaging said second end of said lever means during rotation of said lever means in order to pull said loading means in said second direction.

16. An apparatus for ejecting a caddy inserted onto a caddy holder from a disk player comprising a base and a turntable, said apparatus comprising:
a lower case having a bottom and a front panel containing a receiving hole;
a support plate fixed to said lower case, said support plate having a side wall perpendicular to said bottom of said lower case;
loading means attached to said side wall, disposed to move in a first direction of insertion of the caddy into the disk player and a second direction opposite said first direction, for moving the caddy holder in said first and second directions and along a path of travel parallel to an axis of rotation of said turntable;
slide means disposed to move in said first and second directions, for receiving an external force applied through said receiving hole;
lever means rotatably installed onto said lower case at a lever axis, having a first end connected to said slide means, for rotating about said lever axis in response to movement by said slide means in said first direction;
an eject pin attached to said loading means for contacting a second end of said lever means, and for moving said loading means in said second direction in response to said rotation of said lever means about said lever axis;
a connecting pin attached to said slide means and disposed in a direction parallel to said axis of rotation of said turntable;
a slotted hole having an inner width greater than a diameter of said connecting pin, said slotted hole located in said first end of said lever means, for accommodating said connecting pin, whereby said connecting pin moves in said first direction in response to movement by said slide means in said first direction, said connecting pin simultaneously traversing said inner width of said slotted hole and causing said rotation of said lever means;
a guide pin formed on said lower case;
a guide hole having an inner width in said first and second directions greater than a diameter of said guide pin, said guide hole located in said slide means, for accommodating said guide pin to ensure movement of said slide means in only said first and second directions: and
resilient means for biasing said slide means in said second direction.

17. A method of ejecting a caddy inserted onto a caddy holder mounted inside a disk player to support the caddy, said disk player comprising a base and a turntable, said caddy holder having a loading piece, said method comprising the steps of:
applying external force through a receiving hole in the disk player in a first direction of insertion of the caddy into the disk player in order to move a sliding piece in said first direction;

moving said sliding piece in said first direction in response to said external force applied in said first direction to a first end of said sliding piece and resiliently biasing said sliding piece to move in a second direction opposite said first direction upon release of said external force applied in said first direction;

securing a connecting pin that slideably attaches said sliding piece to a first end of a lever arm within a slotted hole positioned in said first end of said lever arm, positioning said connecting pin to be oriented in a direction parallel to an axis of rotation of said turntable, said slotted hole having an inner width greater than a diameter of said connecting pin;

rotating said lever arm slideably attached at said first end to said sliding piece and moving said connecting pin in said first direction in response to said movement of said sliding piece in said first direction, said connecting pin simultaneously traversing said inner width of said slotted hole and causing rotation of said lever arm in response to said movement of said connecting pin in said first direction;

engaging a second end of said lever arm with said loading piece and moving said loading piece in said second direction in response to said rotation of said lever arm; and moving the caddy holder in response to said movement by said loading piece in said second direction in order to eject the caddy.

18. An apparatus for ejecting a caddy inserted on a caddy holder from a disk player having a lower case, a supporting plate installed on said lower case, said supporting plate having a side wall, a loader installed on said side wall of said supporting plate for loading and unloading the caddy inserted on the caddy holder by moving the caddy holder in a forward, a rearward, an up, and a down direction while said loader is being moved forward and rearward by a motor and a variable speed gear group, said apparatus comprising:

a slider installed on a bottom of said lower case disposed to move linearly, said slider being elastically biased towards a caddy inlet by a spring;

an eject pin installed on said loader; and an ejection lever rotatably attached to said lower case, said ejection lever comprising a first end slideably attached to said slider, and a second end connected to said eject pin for applying a force to said eject pin for moving said loader to eject said caddy in response to an external force being applied to said slider;

a connecting pin slideably attaching said slider to said first end of said ejection lever; and an elongated hole having an inner width greater than a diameter of said connecting pin, said elongated hole positioned in said first end of said ejection lever for receiving said connecting pin;

said connecting pin being movable in said rear direction in response to movement by said slider in said rear direction, simultaneously traversing said inner width of said elongated hole and causing rotation of said ejection lever.

* * * * *

UNITED STATES PATENT AND TRADEMARK OFFICE
CERTIFICATE OF CORRECTION

PATENT NO. : 5,386,407
DATED : Jan. 31, 1995
INVENTOR(S) : Jeong-Se Park

It is certified that error appears in the above-indentified patent and that said Letters Patent is hereby corrected as shown below:

Title page,         IN THE ABSTRACT

[57],       Line 10,       after "force", change "acts on" to --acting on--;

Column 2,   Line 57,       after "pin", change "1a" to --1$a$--;

Column 3,   Line 4,        after "hole", change "7c" to --9$a$--;

Column 4,   Line 64,       before "guide", insert --a--; and

Line 65,       before "guide", insert --a-- and after "first", change "anti" to --and--:

Signed and Sealed this

Sixth Day of May, 1997

Attest:

BRUCE LEHMAN

Attesting Officer          Commissioner of Patents and Trademarks